`US009239143B2`

(12) United States Patent
Wurster et al.

(10) Patent No.: US 9,239,143 B2
(45) Date of Patent: Jan. 19, 2016

(54) AVIATION OBSTRUCTION LIGHTING

(75) Inventors: Clemens Wurster, Augsburg (DE);
Casey Frederick, Lumberton, TX (US);
Mark Frederick, Lumberton, TX (US)

(73) Assignee: ROSENBERGER-OSI GMBH & CO. OHG, Augsburg (DE)

( * ) Notice: Subject to any disclaimer, the term of this patent is extended or adjusted under 35 U.S.C. 154(b) by 744 days.

(21) Appl. No.: 13/540,779

(22) Filed: Jul. 3, 2012

(65) Prior Publication Data
US 2013/0223092 A1 Aug. 29, 2013

(30) Foreign Application Priority Data
Feb. 27, 2012 (DE) .......................... 10 2012 003 815

(51) Int. Cl.
| | | |
|---|---|---|
| *F21V 13/04* | (2006.01) | |
| *F21S 8/08* | (2006.01) | |
| *F21V 7/04* | (2006.01) | |
| *F21V 7/00* | (2006.01) | |
| *F21V 5/02* | (2006.01) | |
| *F21V 8/00* | (2006.01) | |
| *F21V 5/04* | (2006.01) | |
| *F21W 111/00* | (2006.01) | |

(52) U.S. Cl.
CPC ... *F21S 8/08* (2013.01); *F21V 5/02* (2013.01);
*F21V 5/046* (2013.01); *F21V 7/0033*
(2013.01); *F21V 7/0091* (2013.01); *F21V*
*7/041* (2013.01); *G02B 6/0008* (2013.01); *F21V*
*5/045* (2013.01); *F21W 2111/00* (2013.01)

(58) Field of Classification Search
CPC ............. F21S 8/08; F21S 8/085; F21S 8/086;
F21S 8/088; G02B 6/0008; F21V 5/02;
F21V 5/046; F21V 7/0091; F21V 7/0033;
F21V 7/041; F21V 5/045; F21W 2111/00;
F21W 2111/02; F21W 2111/06
See application file for complete search history.

(56) References Cited

U.S. PATENT DOCUMENTS

| | | | | |
|---|---|---|---|---|
| 4,564,736 A | * | 1/1986 | Jones et al. | 219/121.6 |
| 4,768,133 A | * | 8/1988 | Simons et al. | 362/559 |
| 5,541,247 A | * | 7/1996 | Koike | 524/285 |
| 5,764,828 A | * | 6/1998 | Iga et al. | 385/36 |
| 5,894,200 A | * | 4/1999 | Goodale et al. | 315/360 |
| 5,986,792 A | | 11/1999 | Rizkin et al. | |
| 6,270,244 B1 | | 8/2001 | Naum | |

(Continued)

FOREIGN PATENT DOCUMENTS

| | | |
|---|---|---|
| DE | 492936 | 2/1930 |
| DE | 102009034147 | 2/2011 |

*Primary Examiner* — Alan Cariaso
(74) *Attorney, Agent, or Firm* — DeLio, Peterson & Curcio, LLC; Robert Curcio (57) ABSTRACT

An aviation obstruction lighting system having a lamp mounted on the an aviation obstruction at an elevation sufficiently high to serve as a warning of the presence of the obstruction to pilots of approaching aircraft, a remote light source, and an optical waveguide connecting the lamp and the light source and conducting light from the light source to the lamp. The optical waveguide contains quartz glass fibers. The light source is mounted at an elevation to be manually accessible by a technician standing on, or on a platform less than two meters from, the ground. The lamp includes an optical waveguide end receiver, and a Fresnel lens surrounding a reflective element having a conical or frustoconical surface positioned to intercept and reflect light emanating from an optical waveguide, such that the reflected light is directed to an inner incident surface of the Fresnel lens.

20 Claims, 8 Drawing Sheets

(56) References Cited

U.S. PATENT DOCUMENTS

| | | |
|---|---|---|
| 6,328,464 B1 | 12/2001 | Bernardini |
| 6,762,695 B1 | 7/2004 | Eslambolchi et al. |
| 7,083,315 B2 * | 8/2006 | Hansler et al. ................ 362/559 |
| 2003/0156819 A1 * | 8/2003 | Pruss et al. .................... 385/146 |
| 2007/0091634 A1 * | 4/2007 | Sakurada ...................... 362/555 |
| 2011/0286234 A1 | 11/2011 | Nichol |

* cited by examiner

AVIATION OBSTRUCTION LIGHTING

BACKGROUND OF THE INVENTION

1. Field of the Invention

The invention relates to the lighting of aviation obstructions (e.g., towers and other structures that may pose a danger to aircraft), and to an aviation obstruction lighting system and to an aviation obstruction equipped with such a lighting system.

2. Description of Related Art

Legal requirements exist for the lighting of aviation obstructions, which for example in Germany are described in the "General Administrative Regulation on the Marking of Aviation Obstructions." In describing the detailed technical stipulations concerning the design of such lighting systems, this administrative regulation refers to the US ICAO standard, Annex 14: "Aerodomes." Similar requirements are promulgated in the United States by the Federal Aviation Administration.

According to the German standard, outside of airports three types of lighting elements are usually used as obstruction lighting by day and by night, which are listed in the aforementioned ICAO standard with the following designations:

"Low Intensity, Type B" are lamps producing continuous red light of low intensity for obstruction lighting at night and in twilight, preferably for emphasizing the outer contours of obstructions;

"Medium Intensity, Type A" describes a white flashing light, which must emit a luminous intensity of >20,000 cd in daylight and >2,000 cd at night and, for example in Germany, is to be installed in individual cases on aviation obstructions with a height of 150 m and above. The color temperature of the white light must be between 4,000 K and 8,000 K;

"Medium Intensity, Type B" describes a red flashing light which, in individual cases, is used at night with a luminous intensity>2,000 cd as a hazard warning signal on aviation obstructions with a height of over 150 m.

In some embodiments, the lamps of the "Medium Intensity" types A and B are combined in a single lighting fixture.

Incandescent lamps (only for red light), xenon lamps, and increasingly LEDs are usually used as light sources. These lamps are supplied with energy via electrical supply cables laid on the aviation obstruction. In the case of LEDs, as well as the usual local mains voltage, low-voltage cables are also used which, if repairs or maintenance work are necessary, avoid the hazard of an electric shock for the persons carrying out the maintenance/repairs.

Autonomous voltage supply concepts involving solar modules and storage batteries are also increasingly used, at least reducing the hazards arising from high voltages and the costs of laying the connecting cables.

Due in particular to the regular lightning strikes on such aviation obstructions, it is frequently necessary to repair defective lamps, electrical circuits and supply cables at very great heights. The work involved considerably increases the maintenance costs of the aviation obstructions and presents not inconsiderable risks to the repair personnel working at great heights.

SUMMARY OF THE INVENTION

Various aspects of the invention provide an improved lighting system for the obstruction lighting of aviation obstructions. In particular, the maintenance costs for such a lighting system may be reduced. Some aspects of the invention reduce the work involved in the maintenance of a lighting system for the obstruction lighting of aviation obstructions in that, substantially, no or fewer regularly serviced electrical components are mounted at great height on the aviation obstructions. Rather, the light sources and their electrical circuitry can be installed so as to be easily accessible, in particular on the ground or in the vicinity of the ground and in particular in the area of the foot of the aviation obstruction. The light is transmitted to the lamps, which are in some cases installed at a great height (for example, at least 25 m, or in some cases at least 50 m above the ground) on the aviation obstruction. Thus, the lamps and the associated light sources) are designed separately and the transmission of the light takes place through suitable transmission means.

According to one aspect of the invention, an aviation obstruction lighting system comprises at least one lamp mounted on a aviation obstruction at a lighting elevation sufficiently high to serve as a warning of the presence of the aviation obstruction to pilots of approaching aircraft, a light source mounted on the aviation obstruction at an elevation lower than the lighting elevation, and an optical waveguide connecting the lamp and the light source and conducting light from the light source to the lamp. The light source is mounted at an elevation to be manually accessible by a technician standing on, or on a platform less than two meters from, the ground.

It is possible to transmit the light through the air as a directed beam (possibly directed through the use of one or more mirrors). However, such an embodiment may not comply with the applicable regulations in terms of functional reliability, because transmission through the air cannot be reliably guaranteed due to fog, etc., for example.

In a preferred embodiment of the lighting system, the light is therefore transmitted to the lamps from one or more light sources via (one or more) optical waveguides. The transmission of light by means of optical waveguides is reliable and largely uninfluenced by environmental influences, and is suitable for transmitting light from a light source to a lamp.

Optical waveguides based on a core made of plastic (frequently of PMMA) are known and are widely used in optical data transmission. The main advantage of these optical waveguides is their price, which would make them seem advantageous for use in the obstruction lighting of aviation obstructions according to the invention. However, these optical waveguides tend to display a very high attenuation for all color components of white light, of approximately 1,000 dB/km. Presently known plastic core optical waveguides may not be technically suitable for use in an aviation obstruction lighting system in which the lamps are arranged at a height of several hundred meters above the light source, as it may not be reasonably feasible to feed sufficient light into the lower end of the optical waveguide to fulfill the legal requirements for the emission of light in the area of the lamps.

With glass core optical waveguides, and in particular quartz glass core waveguides, on the other hand, attenuation coefficients can be achieved which, for example, only amount to between 10 and 30 dB/km and which would thus, in principle, be suitable for the transmission of the light over distances of several hundred meters. However, these glass fibers, which are widely used in the field of information technology, only display the advantageous low attenuation coefficient at long wavelengths of the light which is to be transmitted. In contrast, the violet, blue and green spectral components of white light are more highly attenuated, so that with an increasing length of the connection a change in color to yellowish and reddish color tones takes place at the output end of the fiber. The fulfillment of the legally stipulated minimum color temperature of white light of 4,000 K therefore cannot be readily achieved using such fibers over long distances.

Quartz glass-based optical waveguides are suitable for the transmission of white light with a largely undistorted spectrum. Such glass fibers have in the past only been considered for use in short lengths (e.g., in sensor technology), in part because their manufacturing costs are relatively high.

Another aspect of the invention is based on the realization that such quartz glass fibers are also suitable for use in transmitting light over a relatively long distance in an obstruction lighting system. Although the installation costs for such a lighting system would be expected to be significantly higher than for a conventional lighting system, over time the overall costs may be considered reasonable due to the significantly lower likelihood of failure and the resulting significantly lower maintenance costs.

Thus, an aspect of the invention features an aviation obstruction lighting system that comprises at least one lamp mounted on an aviation obstruction (e.g., a tower or other structure) at a lighting elevation sufficiently high to serve as a warning of the presence of the aviation obstruction to pilots of approaching aircraft, a remote light source, and an optical waveguide connecting the lamp and the light source and conducting light from the light source to the lamp. The optical waveguide contains quartz glass fibers.

In some embodiments, at least one of the lamps is designed to emit white light, and an optical waveguide with glass fibers which display a maximum attenuation coefficient for all spectral components of white light of 30 dB/km, preferably a maximum of 10 dB/km, is used for the transmission of the light from the light source to the white lamp.

In some cases, the lighting system also includes at least one lamp designed to emit red light, and an optical waveguide with glass fibers with a maximum attenuation coefficient of less than 30 dB/km, preferably less than 10 dB/km, for all spectral components of white light, is used for the transmission of the light to the red lamp. Alternatively, conventional glass fibers known from the field of information technology can be used for this purpose, since their distortion of white light is unproblematic for the red lamps.

It is thus possible only to use the lower white attenuation (e.g., quartz glass) fibers for the transmission of the white light to the corresponding lamps, while the relatively economical glass fibers known from the field of information technology can also be used for the transmission of the red light. Not all of the lamps need to be connected individually with one (or more) light sources via an optical waveguide. Instead, several lamps can be connected with a (single) light source via a fiber coupler and a (single) optical waveguide. In particular, all white lamps can be connected with a white light source via one (or also several, but fewer than the number of white lamps) optical waveguide, and all red lamps can be connected with a red light source via one (or also several, but fewer than the number of red lamps) optical waveguide. In this manner, the overall length of optical waveguide necessary for the lighting system may be reduced. Certain aspects of the invention may be implemented with various known light sources. Preferably, however, at least one of the light sources is designed as a laser. The use of a supercontinuum-laser is preferred as a light source, particularly for emitting white light. Helium-neon-lasers may also be used as a light source for emitting red light. RGB-lasers may as well represent a suitable light source. Xenon-gasdischarge-lamps may further represent a good alternative to laser light sources.

The light fed into the optical waveguide leaves the other end of the waveguide in the form of light rays with a cone of dispersion of approx. 20° to 30°. Such light emission is initially unsuitable for the obstruction lighting of aviation obstructions, since this does not fulfill the radiation characteristic for the light stipulated by law. It can thus be necessary to deflect the light emitted from the optical waveguide in order to achieve the necessary radiation characteristic. For this purpose, the lamps are preferably equipped with an optical ring prism which is preferably attached directly to the light emitting end of the optical waveguide. A ring prism is a geometrical body based on a prism, in which the parallel shift of the polygonal base surface takes place along a curve, resulting in a preferably annular enclosed body. Through the optical ring prism, a lateral 360° radiation of the light can be achieved which, in particular in combination with a drum lens surrounding the ring prism (i.e. a cylindrical Fresnel lens), can provide the necessary radiation characteristic. The ring prism preferably has a triangular base surface, or a rectangular base surface which approximates a triangle, whereby the outer sides of the ring prism preferably run parallel to its longitudinal axis. In an alternative embodiment, the ring prism has a triangular base surface or a rectangular base surface which approximates a triangle, whereby its outer sides are curved.

An alternative embodiment of a lamp that can produce, from the emission of the light from the optical waveguide, the necessary radiation characteristic, features a first conical reflective body which is reflectively coated on (at least part of) its outer surface, and a second conical reflective body which is reflectively coated on (at least part of) its outer surface, whereby the reflective bodies are arranged at a distance from one another with their narrow sides opposite one another. In such a lamp, the light emitting end of the optical waveguide can project into the intermediate space between the reflective bodies and can in particular be coaxial in relation to both, but at least in relation to the reflective body opposite the light emitting end of the optical waveguide. In this case this reflective body is preferably conical in design. The radiation characteristic required for the obstruction lighting of aviation obstructions can be achieved through the reflection off the surface of the reflective body opposite the light emitting end of the optical waveguide—possibly in combination with a further reflection off the second reflective body—and in particular in combination with a drum lens surrounding the reflective bodies.

Thus, yet another aspect of the invention features an aviation obstruction lighting system lamp with a Fresnel lens containing a reflective element having a conical or frustoconical surface positioned to intercept and reflect light emanating from an optical waveguide terminating within the lamp, such that the reflected light is directed to an inner incident surface of the Fresnel lens. In some embodiments the reflective surface is positioned to intercept the light after the light has traveled through a prism, such as a ring prism, and to direct the reflected light back through the prism toward the Fresnel lens. In some other embodiments, the reflective surface is positioned to intercept the light reaching the reflective surface via an open space within the lamp. The reflective surface preferably defines an apex aligned with a mount for a light transmission cable, such that the reflected light is directed to emanate from the lamp in all lateral directions.

Both the German and US regulations for the obstruction lighting of aviation obstructions require that the actual functioning of the lamps arranged on the aviation obstructions be monitored. In conventional lighting systems this is made possible by a simple resistance measurement of the electrical system. Through the resistance measurement it can be determined whether all the lamps are functioning correctly and whether at least one of the lamps is not functioning. This information is sufficient to initiate a manual inspection of the corresponding aviation obstruction and a repair of the defective lamp(s).

In the lighting system in accordance with the invention, the functioning of the light source does not necessarily signify proper light emission from the lamps. Instead, because of the separation between light source and lamp, determining an actual light emission from the lamps requires that a detection device be included. In one embodiment, such a detection device includes a photodiode through which any incident light can be converted into an electrical voltage which can then be used to determine the functioning (voltage present) or non-functioning (no voltage present) of the lamp. The photodiode, which for this purpose should be shielded against any external irradiation of light, can preferably be provided for each of the lamps, and these can, in particular, also be arranged in the vicinity of the lamps (in some cases at a great height on the aviation obstructions). The transmission of the test voltage can take place via economical current-carrying cables to the evaluation unit, which can, for example, be arranged in the area of the base of the aviation obstruction. However, this in turn gives rise to the potential problem that an electrical system is installed at a great height on the aviation obstruction and exposed to the risk of damage through lightning strike.

Alternatively, therefore, in some cases the photodiode is arranged not in the immediate vicinity of the lamp, but in the vicinity of the foot of the aviation obstruction, and at a greater distance from the aviation obstruction itself. The light emitted by the lamps can thereby also be transmitted to the photodiode via an optical waveguide. This can take place via conventional and economic glass fibers known from the field of information technology—irrespective of whether the lamps emit white or red light—since a distortion of the spectrum of the transmitted light is immaterial in determining whether the lamp is functioning.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED
EMBODIMENT(S)

In describing the preferred embodiment of the present invention, reference will be made herein to FIGS. 1-8 of the drawings in which like numerals refer to like features of the invention.

Figure 1:
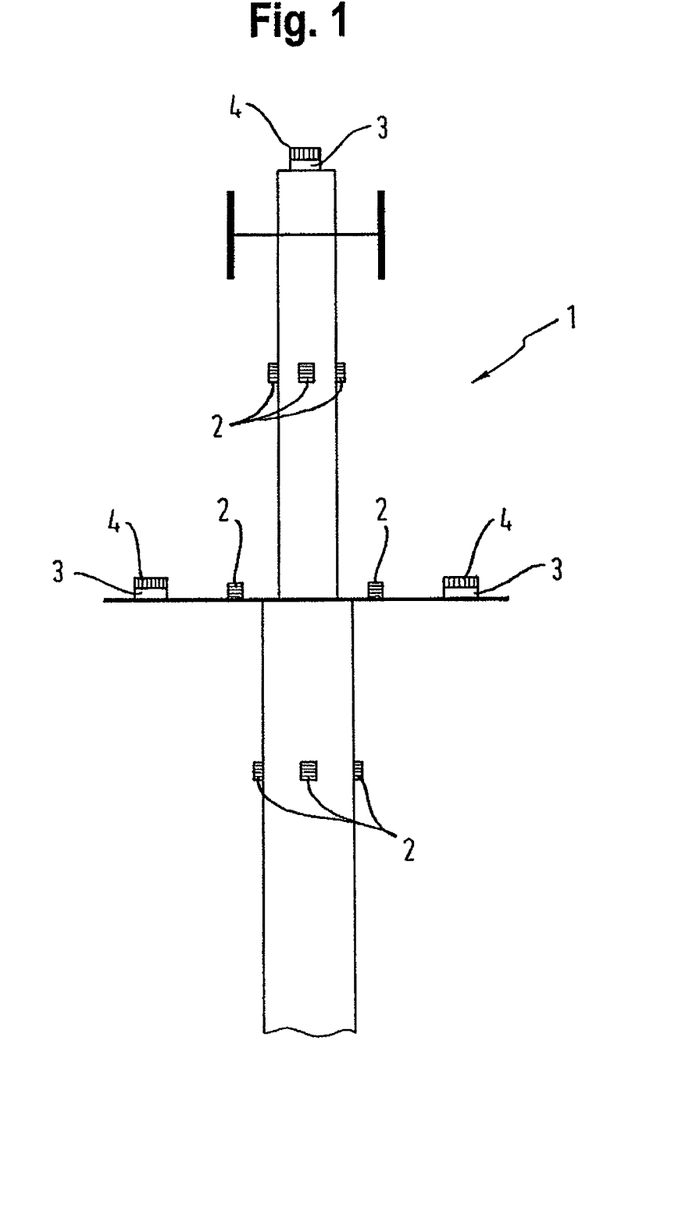
FIG. 1 shows a diagrammatic representation of an aviation obstruction.

FIG. 1 shows an aviation obstruction in the form of a radio mast 1. Such a radio mast 1 can in some cases reach a height of several hundred meters. The radio mast 1 is equipped with a lighting system which serves the purpose of obstruction lighting. The lighting system is based on a plurality of lamps 2, 3, 4 arranged at different heights on the radio mast. In total, three different types of lamps are used which correspond to the three types described in Annex 14: "Aerodromes" of the US ICAO standard. The first lamp type (2; Low Intensity, Type B) involves lamps producing continuous red light of low intensity for obstruction lighting at night and in twilight, preferably for emphasizing the outer contours of the aviation obstruction. The second lamp type (3; Medium Intensity, Type A) involves lamps which emit a white flashing light which emits a luminous intensity of >20,000 cd in daylight and >2,000 cd at night, whereby the color temperature of the light is between 4,000 K and 8,000 K. The third lamp type (4; Medium Intensity, Type B) emits a red flashing light which at night has a luminous intensity>2,000 cd.

Figure 2:
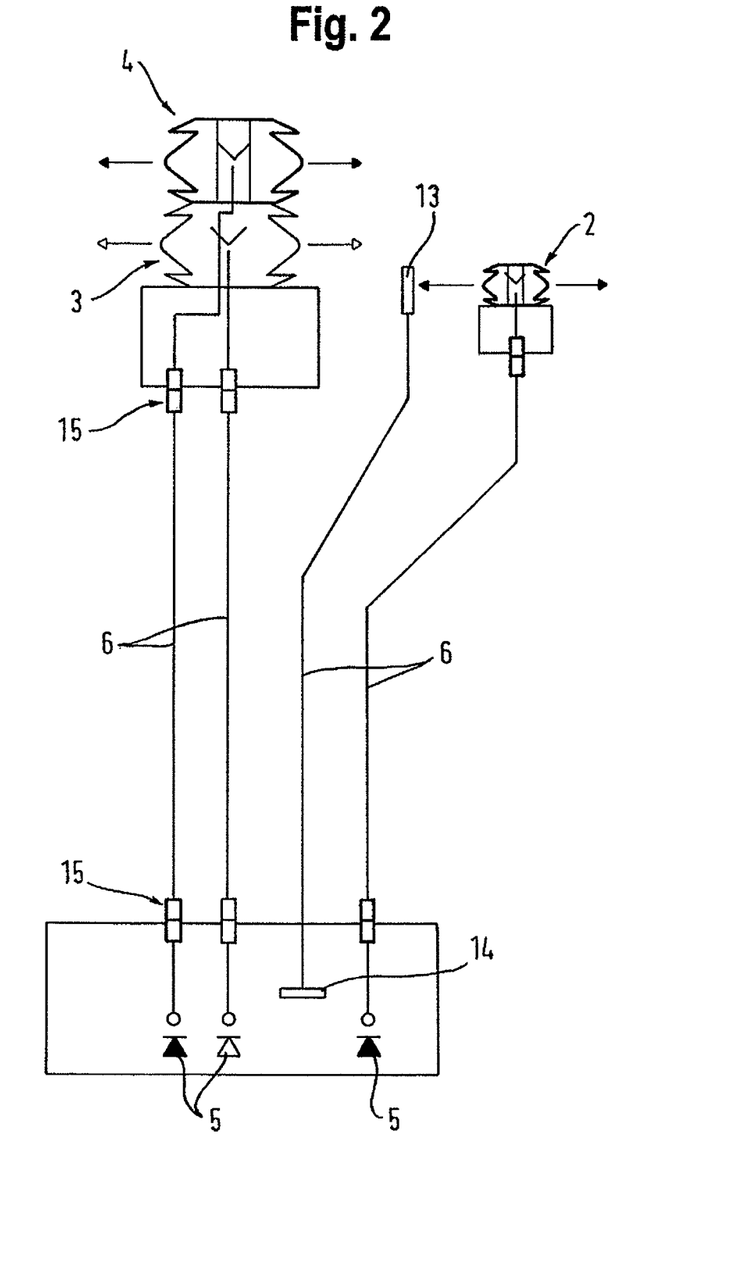
FIG. 2 shows a diagrammatic representation of a first embodiment of a lighting system for the obstruction lighting of the aviation obstruction as shown in FIG. 1.

In the radio mast 1 shown in FIG. 1, the second and third lamp types 3, 4 are combined in a single lighting fixture (see FIG. 2). It is also possible to house these lamp types 3, 4 in separate lighting fixtures (see FIGS. 3 and 4).

FIG. 2 shows a first embodiment of a lighting system, such as can be used on an aviation obstruction as shown in FIG. 1. The lighting system represented here is based on a point-to-point connection between the individual lamps 2, 3, 4 and the associated light sources 5, which are designed as LEDs and which can be arranged in the vicinity of the foot of the radio mast 1 as shown in FIG. 1. This means that each of the lamps 2, 3, 4 is connected via its own optical waveguide 6 with its own light source 5. The light sources 5 connected with the white lamps 3 emit white light and the light sources connected with the red lamps 2, 4 emit red light.

Figure 3:
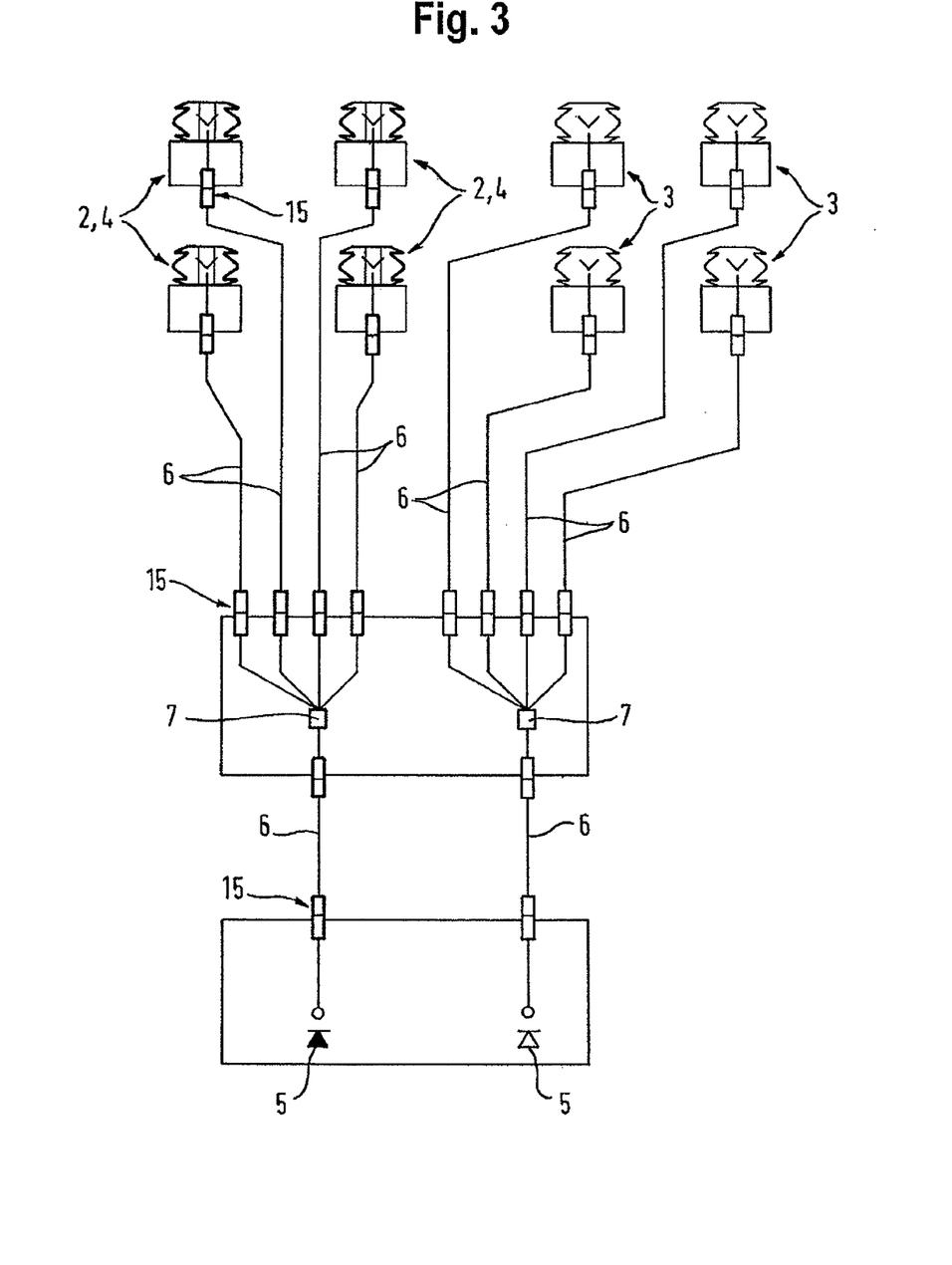
FIG. 3 shows a diagrammatic representation of a second embodiment of a lighting system for the aviation obstruction as shown in FIG. 1.

In contrast, in the embodiment of a lighting system shown in FIG. 3, several red lamps 2, 4 and several white lamps 3 are each connected via a fiber coupler 7 (e.g. a passive 1: N splitter) and this fiber coupler 7 is then connected on the input side, via an optical waveguide 6, with a corresponding light source 5 (LED). This creates the possibility of only using two (one red and one white) light sources 5 and transmitting the light transmitted by these, via only one optical waveguide 6, into the vicinity of the lamps 2, 3, 4, which may in some cases be installed at a great height on the aviation obstruction, from whence the light can then be distributed to several optical waveguides 6 leading to the individual lamps 2, 3, 4.

Figure 4:
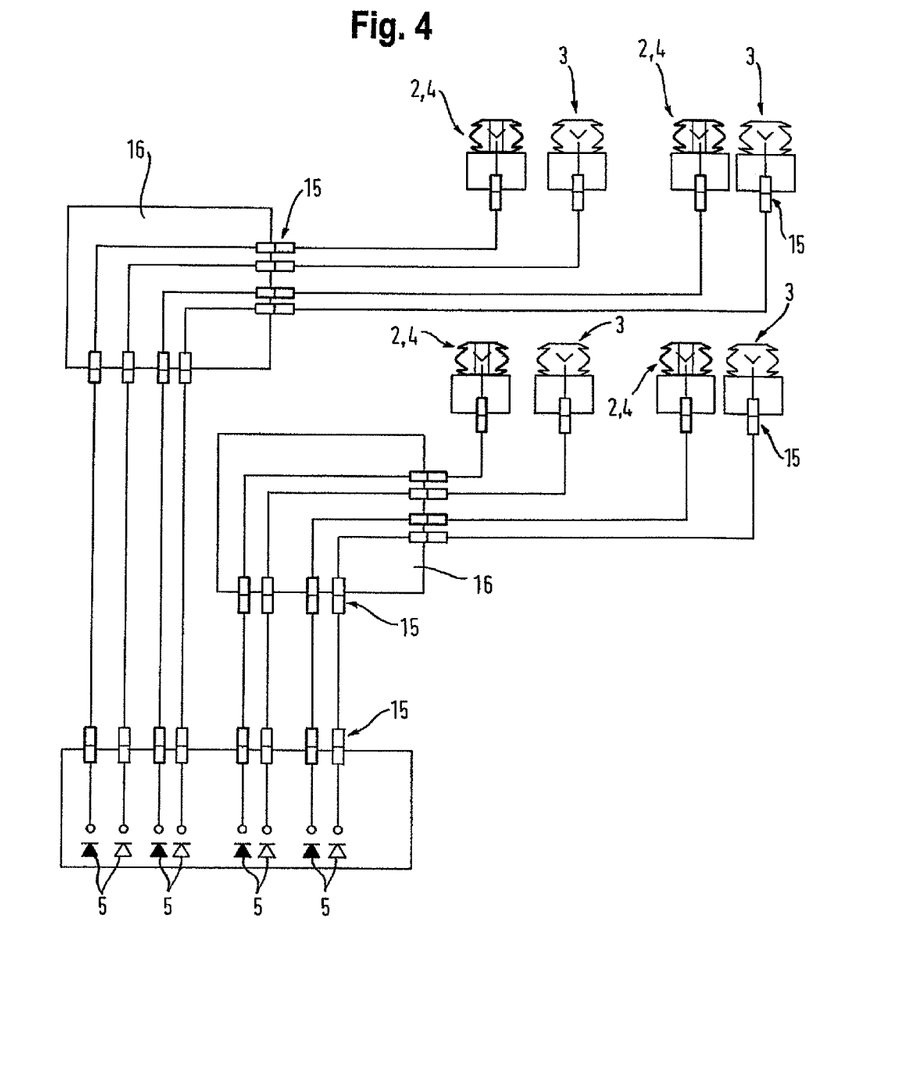
FIG. 4 shows a diagrammatic representation of a third embodiment of a lighting system for the obstruction lighting of the aviation obstruction as shown in FIG. 1.

In the embodiment of a lighting system shown in FIG. 4, as in the embodiment shown in FIG. 2, a point-to-point connection between the individual lamps 2, 3, 4 and the associated light sources 5 is used, whereby in departure from the aforementioned embodiment a structured connection with separated partial networks in vertical and horizontal alignment is set up. A connection system which can be configured in a versatile manner can thereby be built up starting out from the application-neutral cabling topology described in the EN 50173-x series of standards. This topology is particularly suitable if the positions of the lamps 2, 3, 4 on the aviation obstruction are changed frequently. Subdistributors 16 into which the optical waveguides 6 for the lamps 2, 3, 4 are plugged are provided on the individual horizontal levels of an aviation obstruction on which lamps 2, 3, 4 are positioned.

Figure 5:
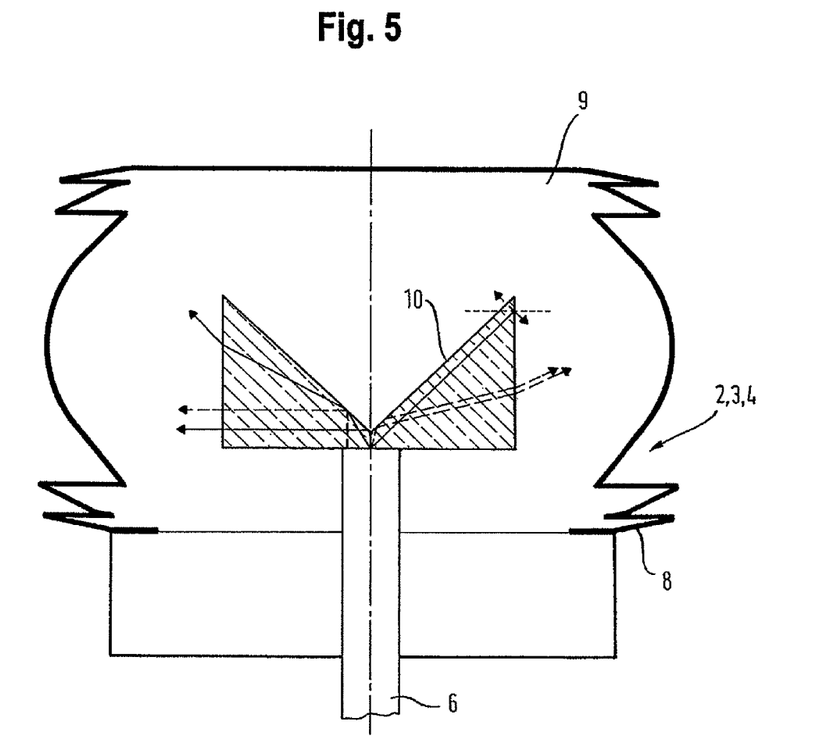
FIG. 5 shows a diagrammatic representation of a first embodiment of a lamp for use in the lighting systems in accordance with FIGS. 2 to 4.

FIG. 5 shows a first embodiment of a lamp 2, 3, 4 for possible use in the lighting systems as represented in FIGS. 2 to 4. The lamp 2, 3, 4 includes a lamp housing 8, which is designed at least partially in the form of a drum lens 9. An optical ring prism 10 (e.g., consisting of an optically transparent and in particular quartz glass) is arranged (relatively centrally) within the inner space formed by the drum lens 9. The base surface of the ring prism is in the form of a rectangle approximating a triangle, with the corners of the rectangle lying on the longitudinal axis of the ring prism 10 lie comparatively close together. The side of this base surface forming the outer surface of the ring prism 10 runs parallel to the longitudinal axis of the ring prism 10. The light emitting end of an optical waveguide 6 is coupled to the underside of the ring prism 10. The light emitted from the optical waveguide 6 is for the most part first reflected and then refracted in the ring prism 10, which, in combination with the drum lens 9 surrounding the ring prism 10, allows a radiation characteristic of the light complying with the legal requirements to be achieved. The greater part of the light intensity is thereby distributed, cylindrically symmetrically, through the ring prism 10 within a limited angle of beam spread. The light rays are then focused through the drum lens 9, which determines the outer contour of the lamp in order to comply with the required radiation characteristic. Examples of different corresponding ray paths are represented in FIG. 5. A further improvement of the radiation characteristic of the ring prism can be achieved in that the surface of the ring prism 10 (opposite the end of the optical waveguide) is reflectively coated, which ensures that, even at an unfavorable angle of incidence, the light rays are reflected from this boundary surface and do not leave the ring prism at this point (as is shown, in broken lines, for two ray paths as an alternative (without reflective coating).

Figure 6:
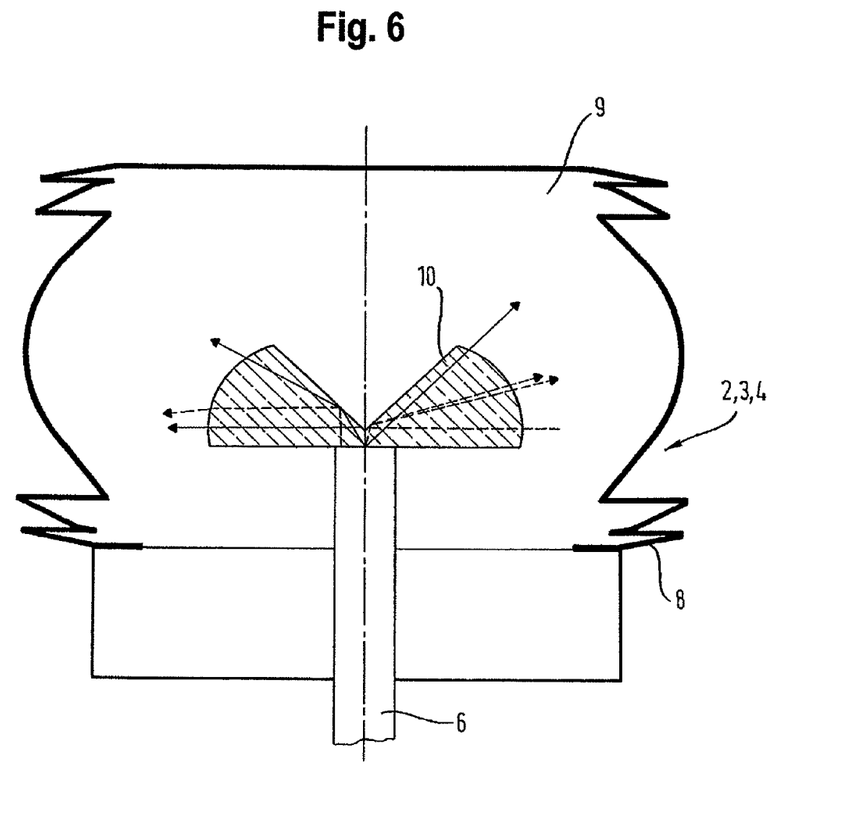
FIG. 6 shows a diagrammatic representation of a second embodiment of a lamp for use in the lighting systems in accordance with FIGS. 2 to 4.

The embodiment of a lamp 2, 3, 4 illustrated in FIG. 6 only differs from that shown in FIG. 5 in the different shape of the base surface of the ring prism used. Here too, a rectangular base surface approximating a triangle is used, in which, however, the side forming the outer surface is curved (around an axis running perpendicular to the longitudinal axis of the ring prism). In this way, a different radiation characteristic is achieved. In this embodiment, too, it is possible to reflectively coat the surface of the ring prism in order to achieve a (virtually) complete reflection of the light rays emitted from the optical waveguide at different angles.

Figure 7:
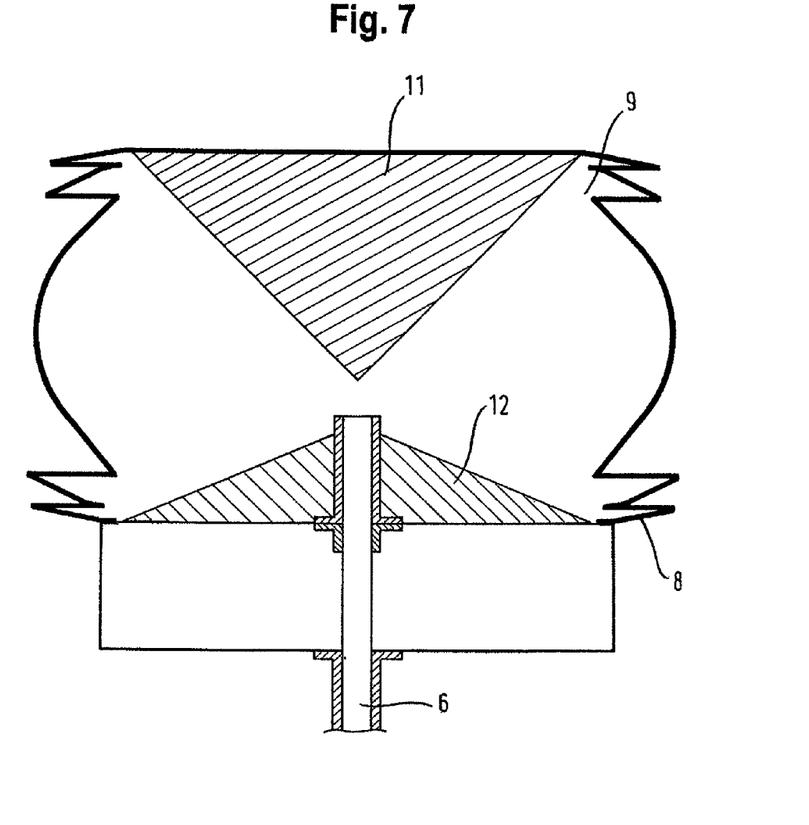
FIG. 7 shows a diagrammatic representation of a third embodiment of a lamp for use in the lighting systems in accordance with FIGS. 2 to 4.

In the embodiment of a lamp for a lighting system shown in FIG. 7, two conical or truncated cone-formed reflective bodies 11, 12 are arranged opposite one another—in coaxial alignment in terms of their longitudinal axes within a lamp housing 8 comprising a drum lens 9, whereby the points or narrow ends of the reflective bodies 11, 12 are arranged opposite one another. The boundary surfaces of the two reflective bodies 11, 12 are reflectively coated in order to achieve a virtually loss-free reflection of the light emitted from a light emitting end of an optical waveguide 6. The optical waveguide thereby projects through a through opening in the second, lower reflective body 12 in an alignment which is as far as possible coaxial with the two reflective bodies 11, 12 into the open space formed between these. The light emitted from the light emitting end of the optical waveguide with a beam spread angle of 20° to 30° is reflected from the first reflective body 11 and then, having been reflected again off the second reflective body 12, is projected directly through the drum lens 9.

The embodiments of lamps 2, 3, 4 illustrated in FIGS. 5 to 7 are suitable for all three lamp types used in the aviation obstructions.

In order to improve the handling and installation of the lighting systems, the light sources 5, fiber couplers 7, lamps 2, 3, 4 and/or the subdistributors 16 may be equipped with one or more plug connections 15 for the optical waveguides 6. This means, in particular, that the laying of the optical waveguides 5 and the installation of the fiber couplers 7, the subdistributors 16 and/or the lamps 2, 3, 4 can be carried out separately. The plug connections can, for example, be based on the standardized optical waveguide connector systems known from the field of optical data transmission. The optical waveguides 6 can thereby be led into the respective housings via a watertight and dustproof conduit; the plug connection itself is then made in the housing. Alternatively, non-standardized watertight and dustproof optical waveguide connector systems can be used which can also be attached to an outer wall of a housing. Naturally, it is also possible to design the optical waveguides in individual segments, which are in turn connected together preferably via corresponding plug connections.

All of the lamps 2, 3, 4 shown in the lighting systems in FIGS. 2 to 4 are equipped with a separate detection device for checking their function, though this is only shown in FIG. 2, and only for the lamp 2 on the right. This detection device comprises a device 13 for coupling the light emitted by the lamp 2, 3, 4 into an optical waveguide 6, via which the light is passed to a photodiode which generates a voltage when light strikes it. In this case the presence of a (sufficiently high) voltage signifies that the relevant lamp 2, 3, 4 is functioning correctly, which can be checked automatically by means of a corresponding control device (not shown).

Figure 8:
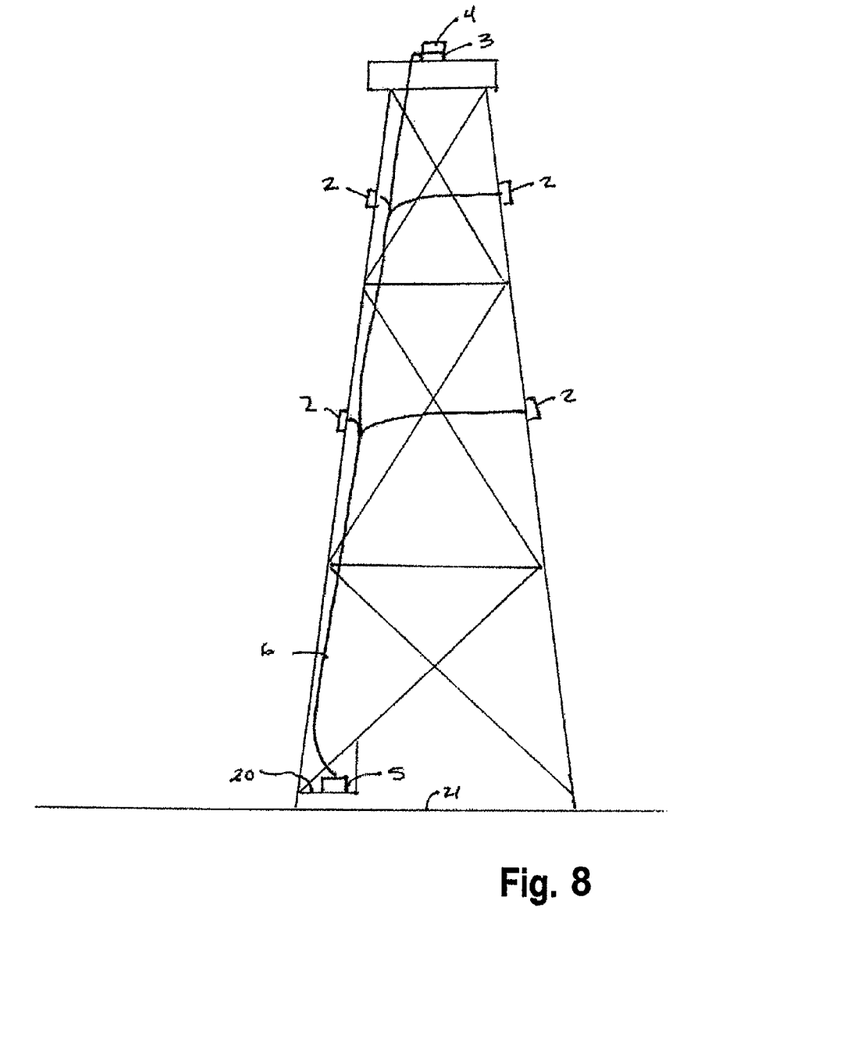
FIG. 8 shows a diagrammatic representation of another aviation obstruction.

FIG. 8 illustrates another aviation obstruction tower marked with lamps 2, 3 and 4. All of the lamps on the tower are illuminated by light originating at a light source 5 mounted on a platform 20 near the base of the tower. The platform is less than two meters from the ground 21, or low enough that a technician standing at ground level can access the light source. Light from light source 5 is transmitted to the various lamps via one or more fibers of an optical wave guide 6. If the lighting system includes lamps of different colors, as shown, the lamps are connected to different sources within light source 5 by respective glass fibers.

While a number of examples have been described for illustration purposes, the foregoing description is not intended to limit the scope of the invention, which is defined by the scope of the appended claims. There are and will be other examples and modifications within the scope of the following claims:

The invention claimed is:
1. An aviation obstruction lighting system comprising:
   a lamp including:
      a first conical reflective body with a reflectively coated outer surface; and
      a second conical reflective body with a reflectively coated outer surface;
   wherein the first and second reflective bodies are spaced apart to define therebetween an intermediate space and are arranged with their apexes facing one another;

said lamp mounted on an aviation obstruction at a lighting elevation sufficiently high to serve as a warning of the presence of the aviation obstruction to pilots of approaching aircraft;

a remote light source; and an optical waveguide connecting the lamp and the light source and conducting light from the light source to the lamp;

wherein the optical waveguide contains quartz glass fibers.

2. The lighting system of claim 1 wherein the lamp is a first lamp configured to emit white light and wherein the optical waveguide has an attenuation coefficient for all wavelengths of the visible spectral range of white light that does not exceed 30 dB/km.

3. The lighting system of claim 2 wherein the attenuation coefficient does not exceed 10 dB/km.

4. The lighting system of claim 2 further comprising a second lamp mounted on the aviation obstruction and configured to emit red light, and connected to the remote light source by an optical wave-guide that has an attenuation coefficient for at least some spectral components of white light of greater than 30 dB/km.

5. The lighting system of claim 1 comprising a plurality of said lamps connected to the remote light source by the optical waveguide.

6. The lighting system of claim 5 wherein the remote light source includes a source of white light and a source of red light, and wherein the plurality of said lamps include both white lamps configured to emit white light, and red lamps configured to emit red light, and wherein the optical waveguide connects the white lamps to the source of white light, and connects the red lamps to the source of red light.

7. The lighting system of claim 1 wherein the remote light source comprises a laser.

8. The lighting system of claim 1 wherein the lamp includes a ring prism.

9. The lighting system of claim 8 wherein the ring prism is connected directly to a light emitting end of the optical waveguide.

10. The lighting system of claim 1 wherein the optical waveguide has a light emitting end projecting into the intermediate space between the reflective bodies.

11. The lighting system of claim 1 further comprising a drum lens surrounding the reflective bodies.

12. The lighting system of claim 1 further comprising a lamp emission detector configured to detect an emission of light from the lamp.

13. The lighting system of claim 12 wherein the lamp emission detector comprises a photodiode and an optical waveguide arranged to transmit light emitted from the lamp to the photodiode.

14. A tower, comprising:

a mast having a base and extending to a height greater than 50 meters; and the lighting system having a lamp, said lamp including:

a first conical reflective body with a reflectively coated outer surface; and a second conical reflective body with a reflectively coated outer surface;

wherein the first and second reflective bodies are spaced apart to define therebetween an intermediate space and are arranged with their apexes facing one another;

said lamp mounted on an aviation obstruction at a lighting elevation sufficiently high to serve as a warning of the presence of the aviation obstruction to pilots of approaching aircraft;

a remote light source; and an optical waveguide connecting the lamp and the light source and conducting light from the light source to the lamp; and wherein the optical waveguide contains quartz glass fibers;

said lighting system being secured to the mast, with the lamp mounted at a height of more than 25 meters, and the remote light source located near the base of the mast.

15. An aviation obstruction lighting system, comprising:

at least one lamp including:

a first conical reflective body with a reflectively coated outer surface; and a second conical reflective body with a reflectively coated outer surface;

wherein the first and second reflective bodies are spaced apart to define therebetween an intermediate space and are arranged with their apexes facing one another;

said lamp mounted on an aviation obstruction at a lighting elevation sufficiently high to serve as a warning of the presence of the aviation obstruction to pilots of approaching aircraft;

a light source mounted on the aviation obstruction at an elevation lower than the lighting elevation; and an optical waveguide connecting the lamp and the light source and conducting light from the light source to the lamp;

wherein the light source is mounted at an elevation to be manually accessible by a technician standing on, or on a platform less than two meters from, the ground.

16. The lighting system of claim 15 wherein the lamp is a first lamp configured to emit white light; the lighting system further comprising a second lamp mounted on the aviation obstruction and configured to emit red light.

17. The lighting system of claim 16 including a lamp emission detector comprising a photodiode mounted at an elevation to be manually accessible by a technician standing on, or on a platform less than two meters from, the ground, and an optical waveguide arranged to transmit light emitted from the lamp to the photodiode.

18. An aviation obstruction lighting system lamp, comprising a first body with a reflectively coated conical or frustoconical outer surface; and a second body with a reflectively coated conical or frustoconical outer surface;

wherein the first and second bodies are spaced apart to define therebetween an intermediate space and are arranged with their apexes facing one another;

an optical waveguide end receiver; and a Fresnel lens surrounding said first and/or second bodies positioned to intercept and reflect light emanating from an optical waveguide terminating within the optical waveguide end receiver, such that the reflected light is directed to an inner incident surface of the Fresnel lens.

19. The lamp of claim 18 further comprising a prism, and wherein the reflective surface is positioned to intercept the light after the light has traveled through the prism, and to direct the reflected light back through the prism toward the Fresnel lens.

20. The lamp of claim 18 wherein the reflective surface is positioned to intercept the light reaching the reflective surface via an open space within the lamp, and wherein the reflective surface defines an apex aligned with a mount for a light transmission cable, such that the reflected light is directed to emanate from the lamp in all lateral directions.

* * * * *